(12) United States Patent
Giancotti et al.

(10) Patent No.: US 10,852,180 B2
(45) Date of Patent: Dec. 1, 2020

(54) MODULE WITH SENSORS ARRANGEMENT

(71) Applicant: Nuovo Pignone Tecnologie Srl, Florence (IT)

(72) Inventors: Marco Giancotti, Florence (IT); Roberto Biondi, Florence (IT); Laurent Ntibarikure, Florence (IT); Stefano Mazzarello, Florence (IT); Stefano Fattori, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 52 days.

(21) Appl. No.: 15/852,284

(22) Filed: Dec. 22, 2017

(65) Prior Publication Data
US 2018/0180464 A1 Jun. 28, 2018

(30) Foreign Application Priority Data

Dec. 22, 2016 (IT) .......................... 102016000130230

(51) Int. Cl.
*G01H 1/00* (2006.01)
*G01M 15/14* (2006.01)
(Continued)

(52) U.S. Cl.
CPC ............ *G01H 1/006* (2013.01); *F01D 21/003* (2013.01); *F01D 25/28* (2013.01); *F02C 7/32* (2013.01);
(Continued)

(58) Field of Classification Search
CPC ........ G01H 1/006; G01H 1/00; F01D 21/003; F01D 25/28; F16M 5/00; F02C 7/32; G01C 9/02; G01M 15/14
See application file for complete search history.

(56) References Cited

U.S. PATENT DOCUMENTS

2004/0068349 A1* 4/2004 Luo .................. F16F 15/005
700/280
2005/0060120 A1 3/2005 Eisenzopf
(Continued)

FOREIGN PATENT DOCUMENTS

CN 204269221 U 4/2015
CN 103758705 B 3/2016
(Continued)

OTHER PUBLICATIONS

Giancotti, M., et al., Modular gas turbine plant with a heavy duty gas turbine, GE co-pending Application No. FI2012A000114, filed on Jun. 8, 2012.
(Continued)

*Primary Examiner* — Helen C Kwok
(74) *Attorney, Agent, or Firm* — Baker Hughes Patent Org.

(57) ABSTRACT

A plant module that has a base plate and/or a frame and one or more turbomachines mounted to the base plate and/or the frame; it comprises a plurality of sensors mechanically connected to the base plate and/or the frame and electrically connected to a data processing unit for receiving data detected by the sensors and processing them; at least one of the sensors is a vibration sensor for detecting vibrations at a point or zone of the base plate and/or the frame, and/or a distance or displacement sensor for detecting a distance or a displacement of a point or zone of the base plate and/or the frame, and/or an inclination or rotation sensor for detecting an inclination or a rotation of a point or zone of the base plate and/or the frame.

14 Claims, 2 Drawing Sheets

(51) Int. Cl.
  *G01C 9/02* (2006.01)
  *F02C 7/32* (2006.01)
  *F01D 21/00* (2006.01)
  *F01D 25/28* (2006.01)
  *G01B 21/32* (2006.01)
  *G01B 21/22* (2006.01)

(52) U.S. Cl.
  CPC ............... *G01C 9/02* (2013.01); *G01H 1/00* (2013.01); *G01M 15/14* (2013.01); *F05D 2240/91* (2013.01); *F05D 2260/83* (2013.01); *G01B 21/22* (2013.01); *G01B 21/32* (2013.01); *G01B 2210/58* (2013.01)

(56) References Cited

U.S. PATENT DOCUMENTS

| | | | | |
|---|---|---|---|---|
| 2008/0150292 | A1* | 6/2008 | Fedor | F03D 1/04 |
| | | | | 290/55 |
| 2010/0235206 | A1 | 9/2010 | Miller | |
| 2013/0276543 | A1* | 10/2013 | Epureanu | G01M 7/02 |
| | | | | 73/663 |
| 2014/0090468 | A1* | 4/2014 | Fu | G01P 15/125 |
| | | | | 73/504.08 |
| 2014/0207417 | A1* | 7/2014 | Messinger | G06Q 10/20 |
| | | | | 702/187 |
| 2014/0366552 | A1* | 12/2014 | Szwedowicz | F02C 7/047 |
| | | | | 60/779 |
| 2015/0019169 | A1* | 1/2015 | Cheng | G01M 15/02 |
| | | | | 702/183 |
| 2015/0039250 | A1* | 2/2015 | Rank | H04R 29/00 |
| | | | | 702/56 |
| 2015/0107342 | A1* | 4/2015 | Jensen | F01D 17/02 |
| | | | | 73/112.01 |
| 2015/0186483 | A1* | 7/2015 | Tappan | G06F 3/0481 |
| | | | | 707/737 |
| 2017/0241958 | A1* | 8/2017 | Matsumoto | G01N 29/30 |
| 2017/0254783 | A1* | 9/2017 | Tralshawala | G01N 29/14 |
| 2017/0344935 | A1* | 11/2017 | Mattingly | G06K 7/10366 |
| 2017/0373612 | A1* | 12/2017 | Sellinger | F04D 29/388 |

FOREIGN PATENT DOCUMENTS

| | | |
|---|---|---|
| EP | 2 743 500 A1 | 6/2014 |
| KZ | 28144 A4 | 2/2014 |
| RU | 2496124 C1 | 10/2013 |
| RU | 144661 U1 | 8/2014 |

OTHER PUBLICATIONS

Giancotti, M., Gas turbine and compressor module for on-shore LNG plants, GE co-pending Application No. 102015000055669, filed on Sep. 28, 2015.

Giancotti, M., Full turbomachinery module for lng plants or the like, GE co-pending Application No. 102016000016865, filed on Feb. 18, 2016.

Italian Search Report and Written Opinion issued in connection with corresponding IT Application No. 102016000130230 dated Sep. 8, 2017.

* cited by examiner

MODULE WITH SENSORS ARRANGEMENT

FIELD OF INVENTION

Embodiments of the subject matter disclosed herein correspond to plant modules with a sensors arrangement.

BACKGROUND OF THE INVENTION

In the field of "Oil & Gas", few years ago, some machine manufacturers started to sell and deliver pre-assembled plant modules comprising typically a plurality of turbomachines.

Typically, the structure of such modules comprises a metal base plate and a metal frame; often, the module has a cabin for staff on duty on the module.

Through the structure of such modules vibrations generated by any turbomachine of a module are transmitted to other turbomachines of the module and deformations due to any turbomachine of the module and/or to external factors influence one or more turbomachines of the module.

In the field of "Oil & Gas", it is known to detect vibrations as such.

In the field of "Oil & Gas", it is known to detect deformations as such.

It would be desirable to gather vibration and/or deformation information regarding a plant module in a systematic and orderly way and through a simple architecture.

This may be useful just after assembling the module (well before operation) for example for its accurate conformance tests.

This may be useful just after installing the module (just before operation) for example for its accurate conformance tests.

This may be useful during operation of the module for guarantying sufficient human security (that may also include wellbeing) and/or turbomachine security and/or module security.

BRIEF DESCRIPTION OF THE INVENTION

Embodiments of the subject matter disclosed herein relate to plant modules.

According to such embodiments, The plant module has a base plate and/or a frame and one or more turbomachines mounted to the base plate and/or the frame; it comprises a plurality of sensors mechanically connected to the base plate and/or the frame and electrically connected to a data processing unit for receiving data detected by the sensors and processing them; at least one of the sensors is a vibration sensor for detecting vibrations at a point or zone of the base plate and/or the frame, and/or a distance or displacement sensor for detecting a distance or a displacement of a point or zone of the base plate and/or the frame, and/or an inclination or rotation sensor for detecting an inclination or a rotation of a point or zone of the base plate and/or the frame.

BRIEF DESCRIPTION OF DRAWINGS

The accompanying drawings, which are incorporated herein and constitute an integral part of the present specification, illustrate exemplary embodiments of the present invention and, together with the detailed description, explain these embodiments. In the drawings.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
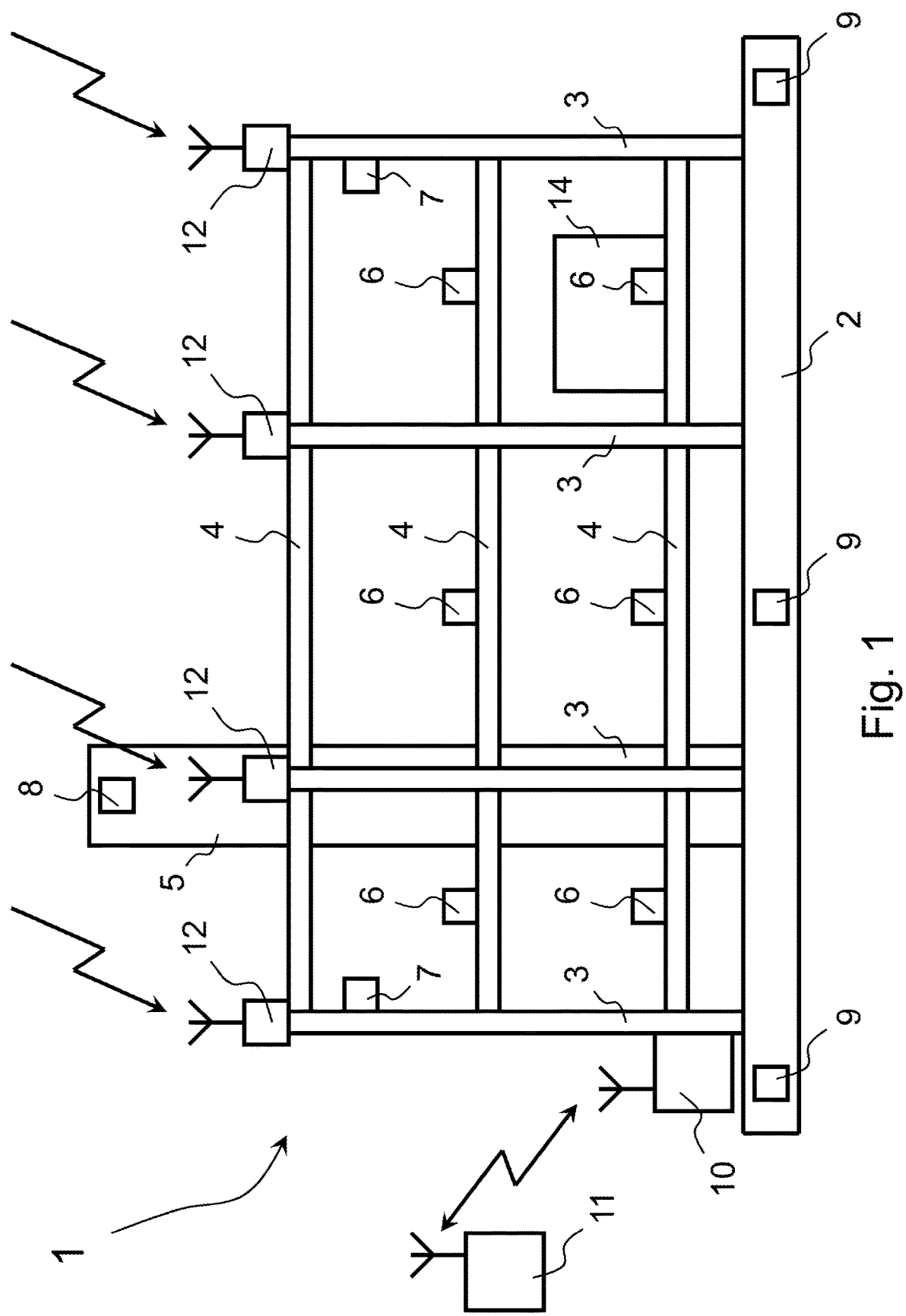
FIG. 1 shows a schematic lateral view of an embodiment of a plant module.

In FIG. 1 a plant module 1 is shown together with a remote electronic unit 11 that may be close to (for example 0.1 or 1.0 kilometer) or far away from (for example 0.1 or 1.0 kilometer) or very far away from (for example 100 or 1,000 kilometers) module 1.

The module 1 of FIG. 1 comprises for example: a metal base plate 2, a metal frame with (e.g. four) vertical bars 3 and (e.g. three) horizontal bars 4 (forming a lattice of beams), a chimney 5, some machines, (such as turbines, compressors, pumps, combustors, motors), and some other pieces of equipment (such as so-called "auxiliaries", coolers, filters, bridge cranes, chimneys, cabins). The machines and the other pieces of equipment are not shown in the figure in order to make it more simple and clear). For example, the vertical bars 3 are fixed to the base plate 2, the horizontal bars 4 are fixed to the vertical bars 3, the machines, in particular at least one turbomachine, and the other pieces of equipment are mounted to the base plate 2 and/or the frame 3 and 4; a cabin 14 for staff on duty on the module 1 is fixed to the frame 3 and 4.

The module 1 is provided with detection and communication system (see FIG. 2) comprising for example a plurality of sensors 6 and 7 and 8 and 9, a set of data acquisition boards 13, a data processing unit 10, and a plurality of GPS receivers 12.

The sensors 6, 7, 8, 9 are mechanically connected to the base plate 2 and/or the frame 3 and 4 and electrically connected to the data processing unit 10 so that the unit 10 may receive data detected by the sensors and process them.

Sensors 6 are vibration sensors for detecting vibrations at points or zones of the frame 3 and 4; similar sensors may detect vibrations at other points or zones for example of the base plate 2. These sensors may comprise or consist of for example acceleration meters or speed meters.

Sensors 7 are inclination or rotation sensors for detecting inclinations or rotations of points or zones of the frame 3 and 4; similar sensors may detect inclinations or rotations of other points or zones for example of the base plate 2; sensor 8 detects the inclination or rotation of the tip of the chimney 5. These sensors may be accelerometers and/or gyros and their detected data are properly processed in order to provide inclination or rotation data.

Sensors 9 are distance or displacement sensors for detecting distances or displacements of points or zones of the base plate 2; similar sensors may detect distances or displacements of other points or zones for example of the frame 3 and 4. These sensors may comprise or consist of for example distance meters or speed meters or acceleration meters.

It is to be noted a base plate and/or a frame of the plant module is typically associated to foundations; there may be distance or displacement sensors (similar to sensors 9) for detecting distances or displacements of points or zones of the foundations. In this case, for example, the sensors are mechanically connectable to the foundations and electrically connected to a data processing unit.

The communication between one or more of the sensors 6, 7, 8, 9 and the data processing unit 10 may be entirely or partially through wired connection.

The communication between one or more of the sensors 6, 7, 8, 9 and the data processing unit 10 may be entirely or partially through wireless connection.

Figure 2:
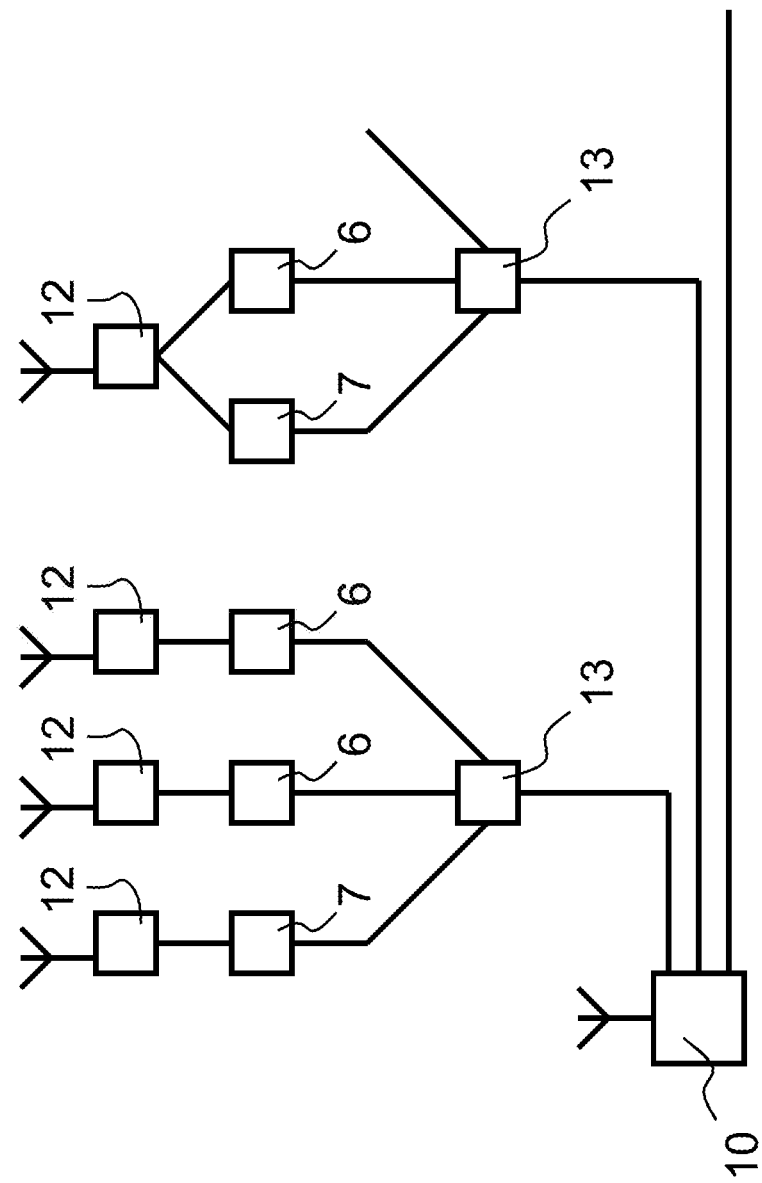
FIG. 2 shows a simplified circuit diagram of the detection and communication system of the plant module of FIG. 1.

An example of such connections are shown in FIG. 2.

According to this example, there are a plurality of acquisition boards 13; each of the acquisition boards receive data from one or more sensors and forward them to the unit 10; therefore, they may be considered "data concentrators".

One or more of the sensors 6, 7, 8, 9 may receive electric power from the data processing unit 10 or a data acquisition board 13.

One or more of the sensors 6, 7, 8, 9 may receive electric power from a local energy harvesting power supply.

According to an embodiment, a sensor may be mechanically connected to a base plate and/or a frame by means of a magnet.

According to an embodiment, the plant module may have sensor assemblies comprising a body (for example a metal body) with a magnet for mechanical connection to a base plate and/or a frame; a sensor assembly may further comprise for example three accelerometers to detect accelerations respectively along the three X, Y, Z axes.

In the embodiment of FIG. 1, the data processing unit 10 is arranged to transmit data or information relating to data detected by the sensors 6, 7, 8, 9 to a remote electronic unit 11. Such transmission may be through an encrypted link. The unit 11 may be, for example, a so-called "cloud server".

The communication between the data processing unit 10 and the remote electronic unit 11 may be entirely or partially through wired connection.

The communication between the data processing unit 10 and the remote electronic unit 11 may be entirely or partially through wireless connection, for example based on Wi-Fi technology.

The data processing unit 10 and/or the remote electronic unit (11) is arranged to process detected data. They may be arranged to provide information relating to the possibility of human long-term operation at the plant module, for example if the well-being of the staff on duty on the module is guaranteed. They may be arranged to provide information relating to the possibility of apparatus long-term operation at the plant module; in particular, long-term operation may relate to the whole plant module and/or any of the pieces of equipment of the plant module, including its machines.

The gathering and processing of data detected by the sensors may be useful:

just after assembling the module (well before operation) for example for its accurate conformance test, just after installing the module (just before operation) for example for its accurate conformance tests, during operation of the module for guarantying the possibility of human and/or apparatus long-term operation at the plant module.

In cases A and B, processing is very accurate, but may be quite slow.

In case C, processing may be less accurate, but should be quite quick.

Especially in cases A and B, the data processing unit 10 or the remote electronic unit 11 may be arranged to process detected data through a computer model of the plant module.

Especially in cases A and B, it is advantageous that at least some of the sensors detect data synchronously between each other. A very effective way of doing this provides that at least some of the sensors use synchronism signals deriving from GPS receivers (label 12 in the figures; in fact, GPS signals contain very precise time, time interval and frequency information. One GPS receiver may be associated to one sensor (see FIG. 2 on the left) or a group of sensors (see FIG. 2 on the right) that are located close for example close to each other.

The detection frequency of the sensors may be from 1 detection per second to 100,000 detections per second.

It is to be noted that when detections are used for accurate conformance tests before normal operation of the plant module, the detection frequency is preferably from 1,000 detections per second to 100,000 detections per second, more preferably from 20,000 to 50,000.

It is to be noted that when detections are used during normal operation of the plant module, the detection frequency is preferably from 1 detection per second to 100 detections per second, more preferably from 20 to 50.

It is to be noted that in cases A and B higher frequencies are preferable and in case C lower frequencies are preferable.

For example, considering the detection frequency ranges set out above, they differ two or three orders of magnitude.

It is also to be noted that the most appropriate frequency may depend on the kind of sensor.

Detection of vibrations and/or distances and/or displacements and/or inclinations and/or rotations were sometimes carried out in machines of "Oil & Gas".

Anyway, embodiments of the subject matter disclosed herein provide for detection of vibrations and/or distances and/or displacements and/or inclinations and/or rotations of one or more zones of the base plate and/or the frame of a "plant module". This does not exclude that in one or more machines of the "plant module" detection of vibrations and/or distances and/or displacements and/or inclinations and/or rotations occurs.

For example, if a part of a machine of a module vibrates too much such vibration may be detected e.g. by a machine sensor taking care only of the monitoring of this machine. Such vibration is transmitted first to the structure (in particular, the beams of its lattice) of the module and may be detected e.g. by a module sensor, and then to other neighbouring machines of the module; in this way, a higher level of monitoring is guaranteed; in fact, this module sensor is taking care of the module and, at least partially and indirectly, of a set of machines of the module.

In other words, a sensor arrangement for the plant module comprises one or more module sensors and may comprise also one or more machine sensors.

In an embodiment, a GPS receiver may be used not only for generating a synchronism signal for the sensors, as explained before, but also for time-stamping data detected the sensors; particularly, sets of data are grouped together and each set of data is time-stamped. Time-stamping may be carried out for example by the acquisition boards or by the data processing unit of the plant module.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A plant module comprising:
a base plate and a frame extending from the base plate, the frame being a lattice structure comprising vertical members and horizontal members, the base plate and the frame configured to support one or more machines mounted to the plant module;
a plurality of sensors to monitor the plant module, wherein at least one of the plurality of sensors is mechanically connected to the base plate and at least one of the plurality of sensors is mechanically connected to the frame; and
a data processing unit configured to receive and process data detected by said plurality of sensors;
a plurality of data acquisition boards, each board in communication with the data processing unit and an associated group of sensors of the plurality of sensors and is configured to receive data from the associated group of sensors and forward the received data to the data processing unit,
wherein the plurality of sensors comprises at least one sensor for detecting vibrations at a point or a zone of the base plate, at least one sensor for detecting vibrations at a point or a zone of the frame, at least one sensor for detecting a displacement of a point or a zone of the base plate, at least one sensor for detecting a displacement of a point or a zone of the frame, at least one sensor for detecting an inclination or a rotation of a point or a zone of the base plate, and at least one sensor for detecting an inclination or rotation of a point or zone of the frame; and
at least one machine sensor, wherein the at least one machine sensor detects vibrations of the one or more machines and at least one of the plurality of sensors indirectly detects vibrations of the one or more machines such that the at least one machine sensor in combination with the at least one of the plurality of sensors provide a monitoring system for the one or more machines.

2. The plant module of claim 1, wherein the data processing unit is arranged to transmit data or information relating to the data detected by said plurality of sensors to a remote electronic unit.

3. The plant module of claim 2, wherein said data processing unit or said remote electronic unit is arranged to process the detected data and provide information relating to apparatus security, in particular the security of the plant module or any of the one or more machines.

4. The plant module of claim 2, wherein said data processing unit or said remote electronic unit is arranged to process the detected data through a computer model of the plant module.

5. The plant module of claim 1, wherein said plurality of sensors receive electric power from a local energy harvesting power supply.

6. The plant module of claim 1, wherein said plurality of sensors detect the data synchronously.

7. The plant module of claim 6, wherein at least some of the plurality of sensors detect data synchronously relative to each other.

8. The plant module of claim 1, wherein a detection frequency of said plurality of sensors may be from 1 detection per second to 100,000 detections per second.

9. The plant module of claim 1, further comprising a plurality of pieces of equipment mounted to the base plate or the frame.

10. The plant module of claim 9, wherein the data processing unit is configured to provide advance operation data regarding long-term operation of the plant module in its entirety and/or long-term operation of any of the plurality of pieces of equipment of the plant module.

11. The plant module of claim 7, further comprising at least one GPS receiver, wherein said plant module is arranged to time-stamp data detected by said plurality of sensors through said at least one GPS receiver.

12. The plant module of claim 11, wherein said data processing unit is connected to said at least one GPS receiver and is arranged to time-stamp data detected by said plurality of sensors through said at least one GPS receiver.

13. The plant module of claim 1, wherein at least one of the plurality of sensors is connected to at least one of the horizontal members of the frame and at least one of the plurality of sensors is connected to at least one of the vertical members of the frame.

14. The plant module of claim 1, further comprising a chimney, wherein at least one of the plurality of sensors is an inclination or a rotation sensor connected to the chimney for detecting an inclination or a rotation at a tip of the chimney.

* * * * *